United States Patent [19]
Martini et al.

[11] Patent Number: 5,389,280
[45] Date of Patent: Feb. 14, 1995

[54] STABLE AND HOMOGENEOUS AQUEOUS FORMULATIONS OF SURFACTANTS

[75] Inventors: Thomas Martini, Kelkheim; Karl-Heinz Keil, Hanau; Ignaz Wimmer, Winhöring, all of Germany

[73] Assignee: Hoechst Aktiengesellschaft, Frankfurt am Main, Germany

[21] Appl. No.: 821,682

[22] Filed: Jan. 16, 1992

[30] Foreign Application Priority Data

Jan. 19, 1991 [DE] Germany .............................. 4101542

[51] Int. Cl.⁶ .................... C09D 9/00; C11D 7/50; C11D 7/32
[52] U.S. Cl. ............................ 252/170; 252/173; 252/545; 252/557; 252/DIG. 14
[58] Field of Search ........... 252/545, 557, 170, 173, 252/DIG. 14

[56] References Cited

U.S. PATENT DOCUMENTS 4,153,561  5/1979  Hümüller et al. .
4,756,845  7/1988  Sugawara et al. .................. 252/545
4,758,378  7/1988  Raemdonck et al. ............... 252/545

FOREIGN PATENT DOCUMENTS 798282  11/1968  Canada .
1492485  7/1967  France .
2376244  7/1979  France .

*Primary Examiner*—Asok Pal
*Assistant Examiner*—E. D. Irzinski
*Attorney, Agent, or Firm*—Connolly & Hutz

[57] ABSTRACT

Stable and homogeneous aqueous formulations of surfactants

Stable and homogeneous aqueous formulations of surfactants having an HLB value of less than or equal to 13, which additionally contain a compound of the formula I

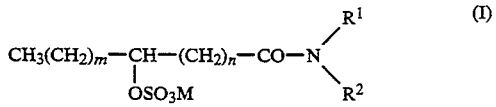

in which $R^1$ is $C_1$–$C_8$-alkyl, $C_1$–$C_8$-alkenyl, phenyl, alkylphenyl or phenalkyl having in each case 1 to 4 carbon atoms in the alkyl chain or cyclohexyl, $R^2$ is hydrogen or one of the radicals mentioned for $R^1$, or $R^1$ and $R^2$, together with the nitrogen atom, are a heterocyclic radical, M is an alkali metal cation, an ammonium cation or one equivalent of an alkaline earth metal or aluminium cation and m and n in each case independently of one another are numbers from 6 to 8.

By the presence of the compounds of the formula I, it is possible to prepare stable and homogeneous aqueous formulations even from those surfactants which are otherwise only sparingly soluble or not soluble at all in water.

20 Claims, No Drawings

STABLE AND HOMOGENEOUS AQUEOUS FORMULATIONS OF SURFACTANTS

DESCRIPTION

Stable and homogeneous aqueous formulations of surfactants

As is known, surfactants are widely used in practice, for example as emulsifiers, dispersing agents, wetting agents, lubricants, detergents and cleaning agents, textile auxiliaries and the like. The surfactants are taken in the form of aqueous formulations for many of these possible uses. This particularly applies to the use of surfactants as textile auxiliaries. Such aqueous formulations are easy to meter and contain no organic solvents which could be unacceptable from the point of view of work safety and toxicology. However, a large number of such surfactants are only sparingly soluble in water, or not soluble at all, the limit between water-solubility and water-insolubility being drawn here using the so-called HLB value. Sparingly soluble or insoluble surfactants here and below are to be understood as those having an HLB value of less than or equal to 13, preferably less than 10.

The object of the present invention is to prepare homogeneous aqueous formulations of such sparingly soluble or insoluble surfactants. These formulations should be stable during storage and should not adversely influence the technological properties of the particular surfactants. To achieve this object, it has been found that certain anionic surfactants can improve the solubility of sparingly soluble or insoluble surfactants in water.

The invention thus relates to stable aqueous formulations of surfactants having an MLB value of less than or equal to 13, preferably less than 10, which additionally contain a compound of the formula (I)

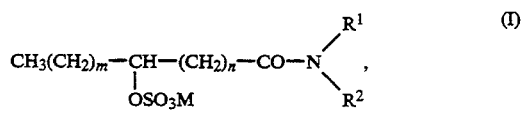

the amount of compound I being 10 to 300% by weight, based on the amount of water present, and the amount of water being 10 to 300% by weight, based on the amount of surfactants.

In formula I, $R^1$ is $C_1$-$C_8$-alkyl, $C_1$-$C_8$-alkenyl, phenyl, alkylphenyl or phenalkyl having in each case 1 to 4 carbon atoms in the alkyl chain or cyclohexyl, $R^2$ is hydrogen or one of the radicals mentioned for $R^1$, or $R^1$ and $R^2$ together with the nitrogen atom, are a heterocyclic radical, M is an alkali metal cation, an ammonium cation or one equivalent of an alkaline earth metal or aluminium cation and m and n in each case independently of one another are numbers from 6 to 8. Preferred compounds of the formula I are those in which $R^1$ and $R^2$ are methyl, ethyl, propyl, isopropyl, 1-butyl, 2-butyl, isobutyl, tert-butyl, pentyl, hexyl, heptyl, octyl, isooctyl, vinyl, allyl, methallyl, crotyl or $R^1$ and $R^2$, together with the nitrogen atom, are a piperidine or morpholine ring. Particularly preferred compounds of the formula I are those in which $R^1$ and $R^2$ are n-butyl, $R^1$ is methyl and $R^2$ is phenyl, or $R^1$ and $R^2$, together with the nitrogen atom, are the morpholine ring.

The compounds of the formula I are prepared by reacting unsaturated fatty acids, such as, for example, oleic acid, castor oil fatty acids or elaidic acid, with amines of the formula $HNR^1R^2$ and subsequent sulfonation. The compounds of the formula I can be present in the pure form, but mixtures of compounds of the formula I with the following compounds are often obtained during their preparation:

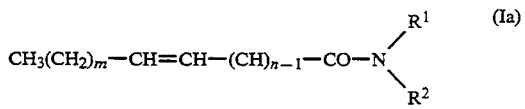

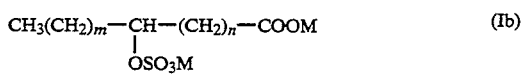

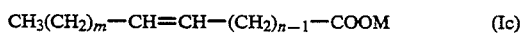

Such mixtures are also possible in the context of the present invention, and the term "compounds of the formula I" accordingly also includes such mixtures. Such mixtures also contain, in addition to the compound I, 0.5 to 10% by weight, preferably 1 to 5% by weight, of the compound Ia, 0.1 to 10% by weight of the compound Ib and 0.1 to 5% by weight of the compound Ic.

The abovementioned compounds are capable, even in small amounts, of improving the solubility of surfactants having an HLB value of less than or equal to 13, preferably less than 10. Possible such surfactants here are, above all, compounds of the group comprising oxyalkylated fatty alcohols, oxyalkylated fatty acids, fatty acid amides, oxyalkylated alkylphenols and fatty acid esters of polyhydric alcohols such as sorbitan, sorbitol or glycerol. Stable aqueous formulations of these surfactants can be obtained by addition of the compounds of the formula I, it being of particular importance that the properties of the surfactants are not adversely influenced by these compounds of the formula I.

The aqueous formulations according to the invention can also contain other additives, such as, for example, glycols, fatty acids or sulfosuccinic acids. The amount of these additives can be about 0.5 to 20% by weight, based on the total aqueous formulation.

The formulations according to the invention are prepared by simply stirring the individual components at room temperature or else at elevated temperatures. Preferably, the compound of the formula I is added to the inhomogeneous mixture consisting of water, surfactant and if appropriate additive, and the mixture is stirred until a clear, homogeneous formulation is obtained.

EXAMPLE 1

10 g of an oleic acid oxyethylate containing 8 ethylene oxide (EO) units (HLB value 11) are mixed with 10 g of water. An inhomogeneous 2-phase system which tends to separate is formed. After 2 g of the compound of the formula I ($R^1$, $R^2$=n-$C_4H_9$, M=Na, m=7, n=8) have been stirred in, a clear, homogeneous and storage-stable product mixture forms.

EXAMPLE 2

A mixture consisting of 40 parts by weight of an oxyethylated oleic acid (8 EO units), 10 parts by weight of butyldiglycol and 8 parts by weight of nonylphenol novolak according to Example 7 from DE-PS 2,132,405 (35 percent strength) and 37 parts by weight of water is inhomogeneous and separates. After addition of 5 parts by weight of the compound of the formula I from Example 1, a clear stable mixture is obtained.

EXAMPLE 3

10 g of an n-$C_{12}/C_{18}$-fatty acid monoethanolamide, reacted with 5 EO units and having an HLB value of 10, are mixed with 8.5 g of water. This results in a pasty, two-phase formulation. A clear, homogeneous, pourable mixture is obtained by addition of 6.5 g of the compound of the formula I from Example 1.

EXAMPLE 4

10 g of an n-$C_{12}/C_{14}$-alcohol, reacted with 2 ethylene oxide units and having an HLB value of 5, are stirred with 3.2 g of water. A pasty formulation is obtained. After addition of 3 g of the compound of the formula I from Example 1, a clear, pourable and stable mixture is obtained on gentle heating to 30°–40° C., the mixture also retaining this nature at room temperature.

EXAMPLE 5

6 g of water are added to 10 g of an iso-$C_{13}$-alcohol, reacted with 2 mol of EO and having an HLB value of 6, and an unstable milky emulsion results. After 3.4 g of the compound of the formula I from Example 1 have been stirred in, a clear solution is obtained.

EXAMPLE 6

5 g of water are added to 10 g of an n-$C_{12}/C_{16}$-alcohol, reacted with 5 mol of EO and having an HLB value of 9. If this mixture is heated to 80° C., a clear formulation is obtained. The same experiment is repeated, but 4 g of the compound of the formula I from Example 1 are added before the heating. A clear, homogeneous solution is now already obtained at 50°–60° C.

EXAMPLE 7

6.2 g of water are added to 10 g of a mixture of n/i-$C_{12}/C_{15}$-alcohols, reacted with 3 mol of EO and having an HLB value of 8, a milky two-phase system being formed. After 2.5 g of the compound of the formula I from Example 1 have been stirred in, a clear, storage-stable formulation is obtained.

We claim:

1. A stable and homogeneous aqueous formulation consisting essentially of at least one surfactant having an "hydrophilic-lipophilic balance" value of less than or equal to 13, and a compound of the formula I

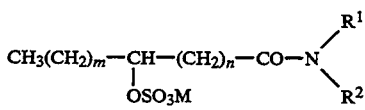

in which $R^1$ is $C_1$–$C_8$-alkyl, $C_1$–$C_8$-alkenyl, phenyl, alkyl-phenyl or phenalkyl having in each case 1 to 4 carbon atoms in the alkyl chain or cyclohexyl, $R^2$ is hydrogen or one of the radicals mentioned for $R^1$, or $R^1$ and $R^2$, together with the nitrogen atom, are a heterocyclic radical, M is an alkali metal or ammonium cation or one equivalent of an alkaline earth metal or aluminum cation and m and n in each case independently of one another are numbers from 6 to 8, the amount of compound of the formula I being 10 to 300% by weight, based on the amount of water, and the amount of water being 10 to 300% by weight, based on the amount of surfactant.

2. A formulation as claimed in claim 1, which contains, in addition to the compound of formula I, 0.5 to 10% by weight of a compound of the formula Ia

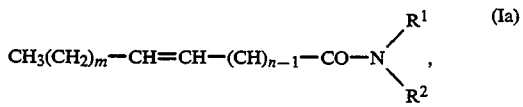

0.1 to 10% by weight of a compound of the formula Ib

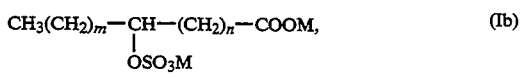

and 0.1 to 5% by weight of a compound of the formula Ic

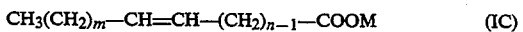

3. A formulation as claimed in claim 1, which contains a compound of the formula I in which $R^1$ and $R^2$ are methyl, ethyl, propyl, isopropyl, 1-butyl, 2-butyl, isobutyl, tert.-butyl, pentyl, hexyl, heptyl, octyl, isooctyl, vinyl, allyl, methallyl or crotyl, or $R^1$ and $R^2$, together with the nitrogen atom, are a piperidine or morpholine ring.

4. A formulation as claimed in claim 1, which contains a compound of the formula I in which $R^1$ and $R^2$ are n-butyl, $R^1$ is methyl and $R^2$ is phenyl, or $R^1$ and $R^2$, together with the nitrogen atom, are the morpholine ring.

5. A formulation as claimed in claim 1, wherein the surfactant has an "hydrophilic-lipophilic balance" value of less than 10.

6. A formulation as claimed in claim 1 which contains as the surfactant at least one compound selected from the group consisting of oxyalkylated fatty alcohols, oxyalkylated fatty acids, fatty acid amides, oxyalkylated alkylphenols and fatty acid esters of polyhydric alcohols.

7. A formulation as claimed in claim 1, which contains further additives selected from the group consisting of glycols, fatty acids, and sulfosuccinic acids.

8. A formulation as claimed in claim 1, which contains, as the surfactant, an oleic acid oxyethylate having 8 units of ethylene oxide, a compound of the formula I in which $R^1$ and $R^2$ are n-$C_4H_9$, M is sodium and m and n are 8, and a nonylphenol novolak.

9. A process for the preparation of a formulation of a stable and homogeneous aqueous formulation consisting essentially of at least one surfactant having an "hydrophilic-lipophilic balance" value of less than or equal to 13, and a compound of the formula I

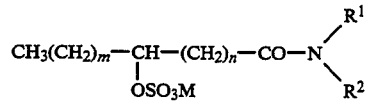

in which $R^1$ is $C_1$–$C_8$-alkyl, $C_1$–$C_8$-alkenyl, phenyl, alkyl-phenyl or phenalkyl having in each case 1 to 4 carbon atoms in the alkyl chain or cyclohexyl, $R^2$ is hydrogen or one of the radicals mentioned for $R^1$, or $R^1$ and $R^2$, together with the nitrogen atom, are a heterocyclic radical, M is an alkali metal or ammonium cation or one equivalent of an alkaline earth metal or aluminum cation and m and n in each case independently of one another are numbers from 6 to 8, the amount of compound of the formula I being 10 to 300% by weight, based on the amount of water, and the amount of water being 10 to 300% by weight, based on the amount of surfactant; which comprises stirring the surfactant and compound of the formula I into water, optionally with compounds of the formulae Ia, Ib and Ic and/or other additives.

10. A stable and homogeneous aqueous formulation comprising at least one surfactant having an "hydrophilic-lipophilic balance" value of less than or equal to 13, and a compound of the formula I

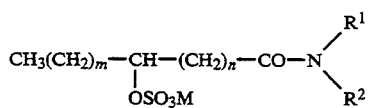

in which $R^1$ is $C_1$-$C_8$-alkyl, $C_1$-$C_8$-alkenyl, phenyl, alkyl-phenyl or phenalkyl having in each case 1 to 4 carbon atoms in the alkyl chain or cyclohexyl, $R^2$ is hydrogen or one of the radicals mentioned for $R^1$, or $R^1$ and $R^2$, together with the nitrogen atom, are a heterocyclic radical, M is an alkali metal or ammonium cation or one equivalent of an alkaline earth metal or aluminum cation and m and n in each case independently of one another are numbers from 6 to 8, the amount of compound of the formula I being 10 to 300% by weight, based on the amount of water, and the amount of water being 10 to 300% by weight, based on the amount of surfactant and in addition to the compound of formula I, 0.5 to 10% by weight of a compound of the formula Ia

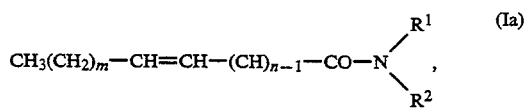

0.1 to 10% by weight of a compound of the formula Ib

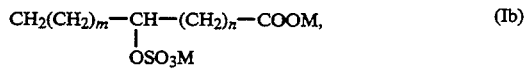

and 0.1 to 5 % by weight of a compound of the formula Ic

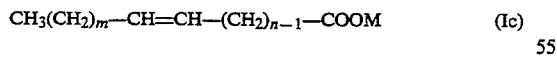

the formulation further contains additives selected from the group consisting of glycols, fatty acids and sulfosuccinic acids.

11. The stable and homogeneous aqueous formulation as claimed in claim 10, consisting essentially of at least one surfactant having an "hydrophilic-lipophilic balance" value of less than or equal to 13, and a compound of the formula I, 0.5 to 10% by weight of a compound of the formula Ia, 0.1 to 10% by weight of a compound of the formula Ib, 0.1 to 5 % by weight of a compound of the formula Ic, and the formulation further contains additives selected from the group consisting of glycols, fatty acids and sulfosuccinic acids.

12. The stable and homogeneous aqueous formulation as claimed in claim 11, consisting of at least one surfactant having an "hydrophilic-lipophilic balance" value of less than or equal to 13, and a compound of the formula I, 0.5 to 10% by weight of a compound of the formula Ia, 0.1 to 10% by weight of a compound of the formula Ib, 0.1 to 5 % by weight of a compound of the formula Ic, and the formulation further contains additives selected from the group consisting of glycols, fatty acids and sulfosuccinic acids.

13. The formulation as claimed in claim 2, wherein 1 to 5% by weight formula Ia is present.

14. The formulation as claimed in claim 1, wherein the "hydrophilic-lipophilic balance" value is from 5 to 11.

15. The formulation as claimed in claim 14, wherein the "hydrophilic-lipophilic balance" value is from 5 to 9.

16. The formulation as claimed in claim 11, wherein 1 to 5 % by weight of formula Ia is present.

17. The formulation as claimed in claim 12, wherein 1 to 5 % by weight of formula Ia is present.

18. The formulation as claimed in claim 16, wherein the "hydrophilic-lipophilic balance" value is from 5 to 9.

19. The formulation as claimed in claim 17, wherein the "hydrophilic-lipophilic balance" value is from 5 to9.

20. The aqueous formulation as claimed in claim 1, consisting of at least one surfactant having an "hydrophilic-lipophilic balance" value of less than or equal to 13, and a compound of the formula I.

* * * * *